United States Patent
Clucas et al.

(10) Patent No.: US 12,341,975 B2
(45) Date of Patent: Jun. 24, 2025

(54) LOW LATENCY COMMUNICATION SYSTEM AND METHOD OF OPERATION

(71) Applicant: V-NOVA INTERNATIONAL LIMITED, London (GB)

(72) Inventors: Richard Clucas, London (GB); Guido Meardi, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 0 days.

(21) Appl. No.: 17/372,052

(22) Filed: Jul. 9, 2021

(65) Prior Publication Data

US 2022/0086456 A1    Mar. 17, 2022

(30) Foreign Application Priority Data

May 12, 2020 (GB) .................................... 2007000
May 13, 2020 (GB) .................................... 2007090

(51) Int. Cl.
*H04N 19/154* (2014.01)
*H04N 19/187* (2014.01)
(Continued)

(52) U.S. Cl.
CPC ......... *H04N 19/154* (2014.11); *H04N 19/187* (2014.11); *H04N 19/59* (2014.11); *H04N 21/2662* (2013.01)

(58) Field of Classification Search
None
See application file for complete search history.

(56) References Cited

U.S. PATENT DOCUMENTS 10,455,194 B1 * 10/2019 Yang .................. H04N 7/15
2003/0169932 A1 * 9/2003 Li .......................... G06T 9/004
382/239
(Continued)

FOREIGN PATENT DOCUMENTS

WO    2015-007754    1/2015

OTHER PUBLICATIONS

Allan et al., "Draft Text of ISO/IEC DIS 23094-2, Low Complexity Enhancement Video Coding" International Organisation for Standardisation, ISO/IEC JTC 1/SC 29/WG 11, N18986, Brussels, BE—Jan. 2020 (Year: 2020).*

(Continued)

*Primary Examiner* — Stuart D Bennett
(74) *Attorney, Agent, or Firm* — Workman Nydegger

(57) ABSTRACT

There is disclosed a system that, when in operation, encodes an input signal provided to an encoder to provide corresponding encoded data, wherein the encoded data is communicated via a data communication network to at least one decoder that decodes the encoded data to regenerate a rendition of the input signal that is output from the at least one decoder; the system is characterized in that the encoder computes and encodes at least one portion or at least one lower resolution layer of the encoded data and communicates the at least one portion or at least one lower resolution layer to the decoder concurrently as the encoder computes and encodes at least one other portion or at least one higher resolution layer of the encoded data for later communication to the at least one decoder, so that the encoder and the at least one decoder function temporally concurrently when processing a given image frame included in the input signal.

16 Claims, 3 Drawing Sheets

(51) Int. Cl.
*H04N 19/59* (2014.01)
*H04N 21/2662* (2011.01)

(56) References Cited

U.S. PATENT DOCUMENTS

| | | | | |
|---|---|---|---|---|
| 2005/0117641 | A1* | 6/2005 | Xu | H04N 19/34 375/E7.091 |
| 2014/0198842 | A1* | 7/2014 | He | H04N 19/597 375/240.03 |
| 2014/0355671 | A1* | 12/2014 | Peng | H04N 19/176 375/240.03 |
| 2014/0376617 | A1* | 12/2014 | Yang | H04N 19/187 375/240.03 |
| 2016/0261381 | A1* | 9/2016 | Ko | H04L 1/1812 |
| 2019/0342581 | A1* | 11/2019 | Deshpande | H04N 19/109 |

OTHER PUBLICATIONS

C. Bachhuber, E. Steinbach, M. Freundl and M. Reisslein, "On the Minimization of Glass-to-Glass and Glass-to-Algorithm Delay in Video Communication," in IEEE Transactions on Multimedia, vol. 20, No. 1, pp. 238-252, Jan. 2018, doi: 10.1109/TMM.2017. 2726189 (Year: 2018).*
Search Report for GB 2007090.0 mailed Apr. 8, 2022.
Thomas Schierl et al: "System Layer Integration of High Efficiency Video Coding", IEEE Transactions on Circuits and Systems for Video Technology, IEEE, USA, vol. 22, No. 12, Dec. 1, 2012 (Dec. 1, 2012), pp. 1871-1884, XP011487157, ISSN: 1051-8215, DOI: 10.1109/TCSVT.2012.2223054.
Parois Ronan et al: "4K Real Time Software Solution of Scalable HEVC for Broadcast Video Application", IEEE Access, vol. 7, Apr. 18, 2019 (Apr. 18, 2019), pp. 46748-46762, XP011720166, DOI: 10.1109/ACCESS.2019.2904196 [retrieved on Apr. 19, 2019].
Simone Ferrara (Mail To: Walt Husak): "AHG on Low Complexity Enhancement Video Coding", 128. MPEG Meeting; Jan. 7, 2019-Jan. 11, 2019; Geneva; (Motion Picture Expert Group or ISO/IEC JTC1/SC29/WG11), No. m49930, Oct. 7, 2019 (Oct. 7, 2019), XP030220883, retrieved from the Internet: URL: http://phenix.int-evry.fr/mpeg/doc_end_user/documents/128_Geneva/wg11/m49930-v1-m49930-LCEVCAHGReport.zip, m49930—LCEVC AHG Report.docx [retrieved on Oct. 7, 2019].
Kazui (Fujitsu) K et al: "Benefit of the new syntax and semantics for very low delay coding in HEVC", 4. JCT-VC Meeting; Jan. 20, 2011-Jan. 28, 2011; Daegu; (Joint Collaborative Team on Video Coding of ISO/IEC JTC1/SC29/WG11 and ITU-T SG.16), No. JCTVC-D054, Jan. 25, 2011 (Jan. 25, 2011), XP030226887, retrieved from the Internet: URL: http:/phenix.int-evry.fr/ict/doc_end_user/documents/4_Daequ/wg11/JCTVC-D054-v2.zip, JCTVC-D054.doc [retrieved on Jan. 25, 2011].
"Draft Text of ISO/IEC DIS 23094-2 Low Complexity Enhancement Video Coding", 129. MPEG Meeting; Jan. 13, 2020-Jan. 17, 2020; Brussels; (Motion Picture Expert Group or ISO/IEC JTC1/SC29/WG11), No. n18986, Mar. 8, 2020 (Mar. 8, 2020), XP030285323, retrieved from the Internet: URL: http://phenix.int-evry.fr/mpeg/doc_end_user/documents/129_Brussels/wg11/w18986.zip, N18986 DIS-v1final.docx [retrieved on Mar. 8, 2020].

* cited by examiner

LOW LATENCY COMMUNICATION SYSTEM AND METHOD OF OPERATION

CROSS-REFERENCE TO RELATED APPLICATIONS

The present application claims the benefit of and priority to UK Patent Application Nos. 2007090.0, filed May 13, 2020, and 2007000.9, filed May 12, 2020, the entire disclosures of which are incorporated herein by reference.

1. TECHNICAL FIELD

The present disclosure relates generally to low latency communication systems, for example to low latency communication systems providing video communication. Moreover, the present disclosure also relates to methods of operating aforesaid low latency systems. Furthermore, the present disclosure relates to encoders and decoders that are useable to implement aforesaid systems. Furthermore, the present disclosure relates to computer program products to execute the aforementioned methods.

2. BACKGROUND

Systems that encode data, communicate encoded data and decode encoded data are known, for example video conferencing systems based on use of the Internet® or mobile telephone communication infrastructure as a data communication network to convey encoded data. In video conferencing systems, it is highly desirable that latency between actions occurring in a scene captured by a camera arrangement to generate a signal (that is then encoded by an encoder to generate corresponding encoded data that is communicated via a data communication network to a decoder that decodes the encoded signal to generate decoded data), and actions in a rendition of the actions occurring in the scene generated from the decoded data is as small as possible. However, such latency can be influenced by a plurality of factors, and can result in the rendition being a temporally inaccurate representation of the actions in the scene. When such latency becomes longer than 1 second, for example in group discussion including a plurality of persons hosted via a video conferencing system, human interaction in the group discussion can be impaired. However, latencies of less than 30 milliSeconds are generally humanly imperceptible and do not cause a technical problem.

Aforesaid latency arises on account of a combination of several temporal delays, namely:
(i) latency arising in the encoder when encoding the input signal, for example depending on a complexity of the input signal;
(ii) latency arising in the data communication network, for example latency arising due to network congestion, when communicating the encoded data; and
(iii) latency arising in the decoder when decoding the encoded data to generate corresponding data for use in generating the rendition.

It is often contemporary practice for groups of persons to adapt their manner of discourse to accommodate such temporal latency. However, when a plurality of participants are coupled together and their actions correspond to a games environment require fast interactive responses, latencies as small as 30 milliSeconds can become very important, especially when such games environments are highly competitive and winners become eligible for monetary prizes.

A conventional approach to address latency is to employ a data communication network with sufficient bandwidth and channels so that noticeable latency is not encountered under operating conditions. However, such an approach is not potentially technically feasible in many circumstances, or is prohibitively expensive. Moreover, in many situations, latency may, as a priority, be more important to keep as low as possible than maintaining image resolution and/or colour resolution, for example at times when data communication network congestion becomes more severe. Furthermore, when data communication networks are implemented in a flexible adaptive manner, for example using reconfigurable peer-to-peer communication nodes, numbers of communication nodes coupled together to form a communication channel are temporally changeable as peer-to-peer communication nodes drop out and other peer-to-peer communication nodes join.

Thus, from the foregoing, it will be appreciated that reducing temporal latency is highly desirable in system supporting interaction between users or remote control systems that are required to react quickly to changing events.

SUMMARY

The present disclosure seeks to provide an improved communication system that, when in operation, provides a reliably low latency from encoder to decoder via a data communication network, for example for video conferences, group games playing and such like but not limited thereto.

In a first aspect, the present disclosure provides a system that, when in operation, encodes an input signal provided to an encoder to provide corresponding encoded data, wherein the encoded data is communicated via a data communication network to at least one decoder that decodes the encoded data to regenerate a rendition of the input signal that is output from the at least one decoder, characterized in that
the encoder computes and encodes at least one portion or at least one lower resolution layer of the encoded data and communicates the at least one portion or at least one lower resolution layer to the decoder concurrently as the encoder computes and encodes at least one other portion or at least one higher resolution layer of the encoded data for later communication to the at least one decoder, so that the encoder and the at least one decoder function temporally concurrently when processing a given image frame included in the input signal.

The invention is of advantage in that temporally concurrent operation of the encoder and decoder to process given image frame information assists to reduce latency arising due to processing delays occurring within the encoder and decoder.

Optionally, in the system, the encoded data is encoded in a tiled manner or a hierarchical layered manner. More optionally, in the system, the encoded data is structured to conform to an LCEVC standard or a VC-6 standard.

Optionally, in the system, the encoded data includes metadata that is dynamically indicative of a level of quality (LoQ) of the encoded data being communicated via the data communication network, to enable the system to adjust the level of quality of the encoded data dynamically to cope with varying congestion within the data communication network.

Optionally, in the system, at least one lower resolution layer includes base layer data enabling a lower resolution rendition of the image frame present in the input signal to be rendered at the at least one decoder, and the at least one higher resolution layer of the encoded data includes enhancement layer data that is useable to enhance the lower resolution rendition of the image frame present in the input signal to provide an enhanced rendition of the image frame at the at least one decoder at a level of quality that is higher than that of the base layer.

Optionally, in the system, when in operation, the encoder aborts transmission of the encoded enhancement layer data in an event of sudden congestion arising in the data communication network, and refreshes its buffer so that a next frame that is communicated after a reduction in the congestion is an I-frame.

Optionally, in the system, the data communication network supports, when in operation, a plurality of channels of communication from the encoder, wherein mutually different categories of tiles or mutually different layers of encoded data are communicated in respective channels of the plurality of channels, such that the one or more decoders receive the encoded data from the encoder via the plurality of channels.

Optionally, the system is adapted for use in at least one of: video conferencing apparatus, group video game playing apparatus, remotely controlled robotics apparatus, remote surveillance apparatus, automotive vision systems.

According to a second aspect, there is provided a method for (namely, a method of) operating a system to encode an input signal provided to an encoder to provide corresponding encoded data, wherein the encoded data is communicated via a data communication network to at least one decoder that decodes the encoded data to regenerate a rendition of the input signal that is output from the at least one decoder, characterized in that the method includes:

using the encoder to compute and encode at least one portion or at least one lower resolution layer of the encoded data and to communicate the at least one portion or at least one lower resolution layer to the decoder concurrently as the encoder computes and encodes at least one other portion or at least one higher resolution layer of the encoded data for later communication to the at least one decoder, so that the encoder and the at least one decoder function temporally concurrently when processing a given image frame included in the input signal.

Optionally, in the method, the encoded data is encoded in a tiled manner or a hierarchical layered manner. More optionally, in the method, the encoded data is structured to conform to an LCEVC standard or a VC-6 standard.

Optionally, in the method, the encoded data includes metadata that is dynamically indicative of a level of quality (LoQ) of the encoded data being communicated via the data communication network, to enable the system to adjust the level of quality of the encoded data dynamically to cope with varying congestion within the data communication network.

Optionally, in the method, at least one lower resolution layer includes base layer data enabling a lower resolution rendition of the image frame present in the input signal to be rendered at the at least one decoder, and the at least one higher resolution layer of the encoded data includes enhancement layer data that is useable to enhance the lower resolution rendition of the image frame present in the input signal to provide an enhanced rendition of the image frame at the at least one decoder at a level of quality that is higher than that of the base layer.

Optionally, the method includes adapting the system for use in at least one of: video conferencing apparatus, group video game playing apparatus, remotely controlled robotics apparatus, remote surveillance apparatus, automotive vision systems and video contribution systems.

According to a third aspect, there is provided a computer program product comprising a non-transitory computer-readable storage medium having computer-readable instructions stored thereon, the computer-readable instructions being executable by a computerized device comprising processing hardware to execute a method according to the second aspect.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and apparatus disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying diagrams, an underlined number is employed to represent an item over which the underlined number is positioned or an item to which the underlined number is adjacent. A non-underlined number relates to an item identified by a line linking the non-underlined number to the item.

DETAILED DESCRIPTION OF EMBODIMENTS

In the following detailed description, illustrative embodiments of the present disclosure and ways in which they can be implemented are elucidated. Although some modes of carrying out the present disclosure is described, those skilled in the art would recognize that other embodiments for carrying out or practicing the present disclosure are also possible.

Figure 2:
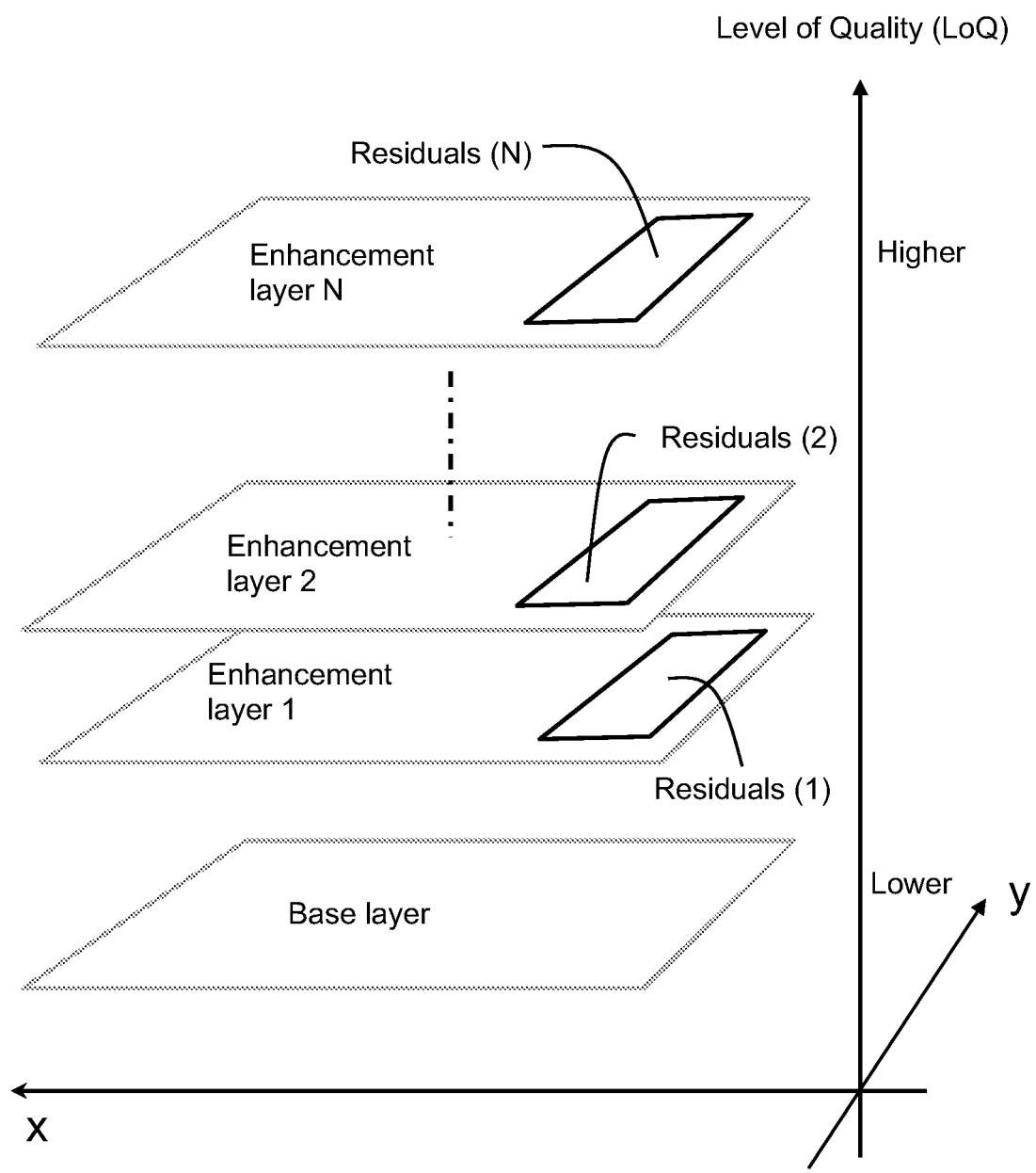
FIG. 2 is an illustration of a hierarchical data structure employed in a system that, when in operation, provides to a given recipient device; the hierarchical data structure is described in published patent applications EP12756254.4, EP12756257.7, EP12756258.5, EP12759220.2 and EP13722424.2 (Applicant: V-Nova International Ltd.) that are hereby incorporated by reference.

Embodiments of the disclosure employ encoders and decoders that employ a tiered hierarchical approach to representing signals, for example video signals, as corresponding encoded data. The tiered hierarchical approach employs a base layer and one or more enhancement layers, for example as described in the aforementioned published patent applications. In a case of LCEVC ("low complexity enhancement video coding"), a LCEVC encoder employs a base encoder, for example implemented in hardware, for generating base layer encoded data that is capable of providing a low resolution rendition of a given video signal, and one or more enhancement encoders, for example implemented using software that is executable using computing hardware, to generate enhancement-layer encoded data that includes residual data that can be used to enhance the low resolution rendition to generate enhanced images of higher quality than the low resolution rendition. In order to provide backward compatibility, the base encoder is optionally implemented using known encoding hardware conforming well-established standards, for example H.264, H.265, MPEG-2, MPEG-4, MPEG-5, VP-9, AV-1. In such a situation, the quality of rendition that is achievable at a given decoder depends upon operation of the one or more enhancement encoders whose operation can be dynamically controlled within software. The one or more enhancement layers include residual data that is generated by employing during encoding a combination of image downsampling and upsampling transformations followed by a subtraction operation; optionally, the downsampling and upsampling transformations are mutually asymmetrical in nature to provide the residuals with particularly preferred entropy characteristics that provide for highly efficient data compression during encoding. Moreover, optionally, a quantization operation is employed during encoding to control an amount of data needing to be encoded. Alternatively, in a case of the VC-6 standard, a tiered hierarchy of layers is employed with base layer and one or more enhancement layers, although no attempt is made for the base layer to be backward compatible with the aforesaid known encoding standards. Beneficially, during encoding of residuals, run-length encoding followed by Huffmann encoding are employed. Optionally, the residuals are subject to additional transformations, for example wavelet transformations such as Hadamard transform, prior to run-length encoding and Huffmann encoding to achieve a greater degree of data compression. A representation of a hierarchical structure for representing an image is depicted in FIG. 2, wherein a base layer is denoted by 10, and enhancement layers are denoted by 20(1) to 20(N), wherein N is an integer. Optionally, there is a single enhancement layer wherein N=1; alternatively, there are a plurality of enhancement layers wherein N>1. Use of such a base layer 10 and one or more enhancement layers 20 enables scalability within a codec arrangement by adjusting a degree of quantization used, or by selectively electing to employ only a certain number of enhancement layers. Optionally, when data communication network congestion is severe, certain enhancement layers are omitted in data transmitted from a given encoder to a corresponding given decoder to reduce an amount of data that needs to be communicated.

Figure 1:
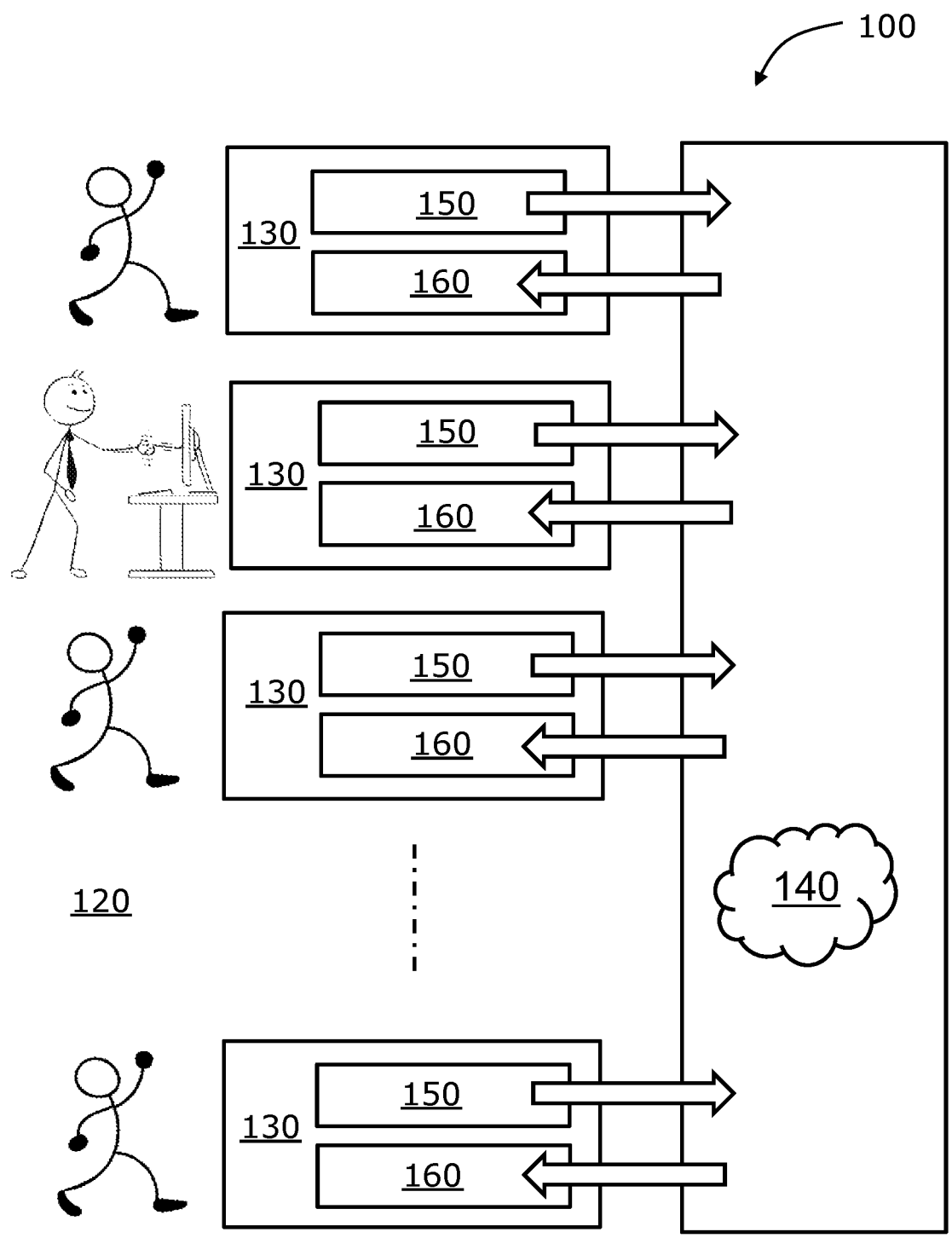
FIG. 1 is a schematic illustration of a low latency communication system that, when in operation, provides interactive video interaction between a plurality of users.

In FIG. 1, there is shown a video conferencing system indicated generally by 100. The system 100 includes a plurality of users 120 with user devices 130. The user devices 130 are coupled together via a data communication network 140, for example the Internet® 140, alternatively a wireless communication network (for example, mobile telephone network such as 4G® or 5G®).

The user devices 130 each beneficially include an encoder 150 and a decoder 160, so that the users 120 are able to converse orally in a bi-directional manner, and see video images of one another, when the system 100 is in operation.

When communicating between users devices 130 in the system 100, there are three temporal delays that are significant:

(i) encoding delay De(LoQ, F), wherein LoQ corresponds to level of quality (colour resolution, spatial pixel resolution), F corresponds to frame rate;
(ii) transmission delay Dt(E), wherein E is a data rate to be communicated, wherein E=f(LoQ, F) wherein f is a function; and
(iii) decoding delay Dd(LoQ, F).

A total latency DT experienced within the system 10 when in operation is given by:

$$DT=De(LoQ,F)+Dt(E)+Dd(LoQ,F)$$

Using an encoding scheme that allows for parallel processing in the encoders 150 and/or the decoders 160 is capable of reducing the delays De and Dt, thereby reducing latency. Moreover, by employing a LoQ controlled via parameters (e.g. metadata) associated with one or more enhancement layers in software, the amount of data E to be communicated via the network 140 can be dynamically varied during a period of a video conference session being hosted by the system 100. If the network 140 is bandwidth restricted due to congestion or a nature of the network 140 (e.g. peer-to-peer configuration of limited bandwidth), reducing the amount of data E to be communicated enables a higher framerate F to be achieved for a given data communication bandwidth being available. Optionally, the system 100 supports both spatial data as well as temporal data for motion estimation purposes, to provide a high degree of data compression when communicating video data between the user devices 130.

In a real-time video system, for example the aforementioned system 100, there is provided video conferencing or 'contribution' of live feeds when in operation; a time DT taken to encode, transmit, decode and display (namely, known as 'glass to glass') can be of critical importance, as aforementioned.

When using known types of video codecs for real-time video systems, a 'full' image frame is normally processed in order to give a maximum 'compression' performance when generating encoded data to be communicated via a data communication network; such a manner of operation is especially true when using a 'temporal' CODEC, such as contemporary H.264, H.265, AV1 and similar standards. Moreover, when using known types of video codecs, it is conventional practice to encode such a 'full' image frame (conveniently referred to as an 'Intra' frame) before subsequently starting to transmit video data in a sequence of video frames; the 'full' image frame has to be received in full before an associated video data in a sequence can be decoded.

However, when implementing the system 100, it is feasible to employ a mobile telephone as the user device 130 for video conferencing purposes; for example, as a best case scenario, the encoder 150 takes 8 milliSeconds (De) to encode a 1080p video frame to generate corresponding encoded data, the network 140 takes 10 milliSeconds (Dn) to transmit the encoded data, and the decoder 160 takes 8 milliSeconds (Dd) to decode the encoded data received to generate a rendition on a pixel display for a user 120 to observe. In aggregate, the total latency DT is in an order of 26 milliSeconds; however, in non-ideal circumstances, the total latency DT can be much longer, for example in an order of 500 milliSeconds.

Embodiments of the present disclosure are capable of enabling the system 100 to achieve an ultra-low degree of latency when in operation, as will next be elucidated.

In a first embodiment, there is used a layered codec such as MPEG5 part2 (LCEVC) or VC-6, wherein each individual image frame communicated from a given encoder 150 to a given decoder 160 via the data communication network 140 comprises data that provides for a rendition of the image frame of a minimum of two mutually different resolutions; in such a situation, a given encoder 150 of the system 100 starts sending data at one or more lower resolutions, for example at base layer resolution, as soon as the data for the one or more lower resolutions are computed, wherein a corresponding given decoder 160 of the system 100 starts to decode the data for the one or more lower resolutions before the given encoder 150 has completed computation and transmission of data corresponding to data for one or more higher resolutions are even completed. In such manner, at least the given decoder 160 receives data of the image frame at a lower resolution quickly with ultra-low latency. In view of the lower resolution, the data to be communicated initially has a corresponding low payload E, wherein such data is communicated very promptly via the data communication network 140.

In this first embodiment, when using a Layered CODEC such as MPEG 5 part2 (LCEVC), wherein the lower resolution would be a quarter of the full resolution and encoded with the same hardware encoder as the above example, data corresponding to the lower resolution would become available at the encoder 150 to start sending after a latency period of 2 milliSeconds; if it is assumed that a same 'transmission' latency arising within the data communication network 140 is 10 milliSeconds as above, although in practice it would be less as there would be less data to transmit before decoding can be started, it is feasible to start a decode process in the decoder 160 that would take 2 milliSeconds for the lower resolution and a final part of decoding process would be implemented later when data corresponding to the higher resolution layer arrives; by such an approach, within the system 100, encoding processes occurring within the encoder 150 are temporally overlapped with decoding processes within the decoder 160. This could then complete the decode process occurring in the decoder 160 temporally in parallel with the encode process occurring in the encoder 150, thereby effectively making the whole encode decode process only take 2+2 milliSeconds in addition to the transmission time for data communication via the data communication network, providing the "glass-to-glass" latency down to 14 milliSeconds; this is to be contrasted with the 8+8 milliSeconds for a conventional approach together with 10 milliSecond data transmission delay, namely 26 milliSecond in aggregate.

In a second embodiment, when using any video CODEC, the given image to be communicated within the system 100, for data processing purposes, is partitioned into 'tiles' which are encoded as mutually separate streams. In a simplest form, there are two streams, using a 1920×1080 element image frame as an example, each stream could correspond to 960×1080 element image sub-frames (in order to maximise compression efficiency). Using the same hardware encoder 150 as described in the foregoing, such a 'tile' would take 4 milliSeconds to encode at the encoder 160, at which point in time transmission would begin while the other 'tile' being encoded in the encoder 150; transmission of data corresponding to the first tile via the data communication network 140 can start to be decoded at the decoder 160 before encoding of the second tile is completed. Once the final part is received, it can be decoded within a duration of 4 milliSeconds. Thereby, there is achieved an end-to-end latency of 4+4 milliSeconds in addition to the transmission latency of 10 milliSeconds arising in the data communication network 140, namely the delay DT aggregate is 18 milliSeconds. Optionally, in the second embodiment, smaller tiles could be used, but there would arise a corresponding reduction in compression efficiency than having merely two tiles; it will be appreciated that the lower the compression efficiency, the longer it takes to transmit the data so an optimal compromise between aggregate latency and compression efficiency would need to be made for the second embodiment.

Thus, embodiments of the present disclosure are capable of providing ultra-low latency real-time video delivery via use of a 'layered' video CODEC, for example employing a data structure as described in published patent applications EP12756254.4, EP12756257.7, EP12756258.5, EP12759220.2 and EP13722424.2 (Applicant: V-Nova International Ltd.) that are hereby incorporated by reference. Moreover, embodiments of the present disclosure are capable of providing ultra-low latency real-time video delivery via use of a video CODEC that encodes images in a tiled manner, for example as employed in VC-6 standard.

Furthermore, there is disclosed a computer program product comprising a non-transitory computer-readable storage medium having computer-readable instructions stored thereon, the computer-readable instructions being executable by a computerized device comprising processing hardware to execute a method for operating the system 100 as described in the foregoing.

Figure 3:
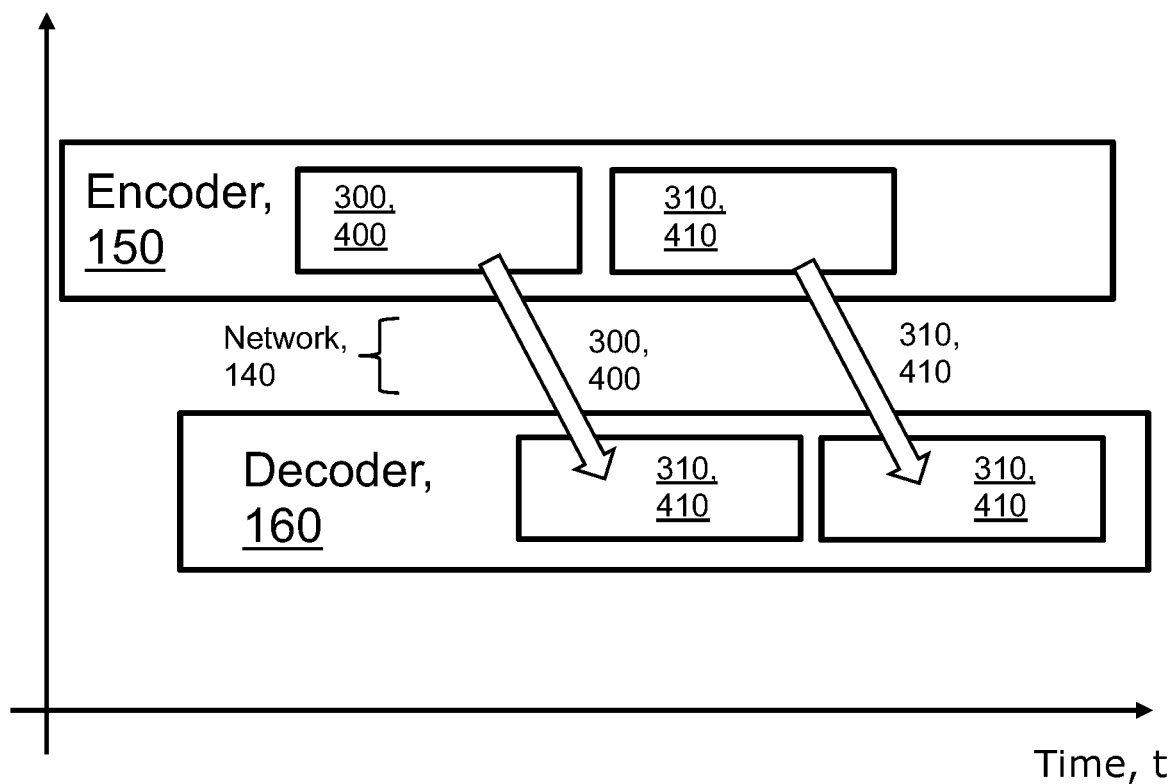
FIG. 3 is an illustration of temporally overlapping processing employed within the system of FIG. 1.

Referring to FIG. 3, there is shown an illustration of temporally overlapping processing employed within the system 100 of FIG. 1. Base layer data 300 is computed in the encoder 150 and transmitted via the data communication network 140 to a given decoder 160, concurrently while the given encoder 150 completes its processing by encoding enhancement layer data 310 that is then communicated via the data communication network 140 to the given decoder 160.

Alternatively, in FIG. 3, a first tile of data 400 is computed in the given encoder 150 and transmitted via the data communication network 140 to a given decoder 160, concurrently while the given encoder 150 completes its processing of the second tile of data 410 that is then communicated to the given decoder 160. It will be appreciated that two tiles are described herein as a simple embodiment, and beneficially more than two tiles are employed, with corresponding temporal overlapping employed in the system 100 when communicating data from the given encoder 150 via the data communication network 140 to the given decoder 160.

Although use of the system 100 for video conferencing purposes is described in the foregoing, it will be appreciated that the system 100 is susceptible to being used in group gaming situations, where a plurality of players (i.e. users) 120 mutually compete at a computer game, wherein latency is undesirable because a delay in response may unfairly benefit certain players 120 and prejudice against other players 120. The video streamed to the plurality of players 120 concerns a video game, wherein each player 120 is able, via controls of their respective user devices, to control characters or events arising within the video game. Optionally, the video game is streamed from a server arrangement that is coupled to the data communication network 140. Each player's device 130 includes at least one decoder 160, optionally also an encoder 150 in a situation where video images of a given player 120 are to be incorporated by the server arrangement into the video game (for example a face region of the given user 120).

The system 100 is also susceptible to being used in remote robotics, wherein a device 130 is included on a robot that is control remotely via the data communication network 140 from a given user device 130 operated by a corresponding user 120. When using the robot to handle tasks quickly, latency can be very disconcerting to the user 120. Embodiments of the present disclosure provide an ultra-low latency operation that makes such remotely-controlled robotics easier to operate when performing delicate quickly-changing tasks, for example requiring a high degree of dexterity. Applications include medical robotics, remote handling of toxic waste (such as high-level nuclear waste, bomb disposal systems and such like), mining and such like.

The system 100 is also susceptible to being used in surveillance systems where scene events need to be tracked with low latency, for example vehicular imaging systems, remote traffic surveillance systems, automatic traffic light control systems, aircraft collision avoidance systems and so forth, just to mention a few examples.

In the foregoing, it will be appreciated, especially when the encoded data being communicated within the system 100 from a given encoder 150 to a given decoder 160 corresponds to an I-frame (intra-frame) and motion estimation is used to generate subsequent frames in the given decoder 160, that the I-frame data is communicated over a plurality of frames corresponding the data 300, 310, 400, 410. More optionally, the I-frame data is communicated over a period corresponding to 2 or 3 frames to reduce a peak data flow occurring within the system 100; however, such temporal spreading of data requires more associated control data to be communicated from the given encoder 150 to the given decoder 160, so a reduction of peak data flow within the system 100 can be achieved at a cost of increasing an overall amount of data that needs to be communicated from the given encoder 150 to the given decoder 160.

In embodiments of the present disclosure, the data communication network 140 supports multiple channels for communicating encoded data from a given encoder 150 to one or more given decoder 160. Such multiple channels enables the system 100 to function with "Joint Source Channel Coding" that is capable of leveraging in real time feedback from a wi-fi or 5G transmission modem, using real-time channel information when communicating the encoded data. However, using such a plurality of channels when the system 100 initiates transmission and decoding of the base while encoding enhancement layer data.

It will be appreciated that the system 100 utilizes a manner of operation. even after having encoded data corresponding to the enhancement layers, during transmission of the enhancement layer encoded data, to abort transmission of a remaining portion of the enhancement layer data in an event that congestion within the data communication network 140 suddenly (for example, within a few milliSeconds) increases, in order to ensure that communication within the system 100 maintains an ultra-low latency, despite the congestion; in such case, merely a NADA of a given frame is transmitted via the data communication network 140. Thus, by informing the given encoder 150 that the enhancement layer encoded data could not be transmitted, the given encoder 150 can treat a following frame as a sort of I-frame as per LCEVC, namely to refresh a temporal buffer in the given encoder 150, which would otherwise be corrupt, and start from scratch with the enhancement layer data encoding. Such a manner of operation provides for quick recovery of the system 100 in response to sudden severe congestion arising within the data communication network 140.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

The invention claimed is:

1. A system enabled to encode an input signal and to provide corresponding encoded data to a decoder, wherein the encoded data is communicated via a data communication network to the decoder, the decoder enabled to decode the encoded data to regenerate a rendition of the input signal, wherein the system is controlled by a timing requirement in which the system is required to start sending the encoded data, which is at a lower resolution, to the decoder as soon as the encoded data is finished being computed and in which the system is further required to send the encoded data before completing computation and/or transmission of additional encoded data corresponding to data for one or more higher resolutions, the system comprising:

an encoder; and a network communication interface, wherein the system facilitates an encode decode process having a threshold degree of latency, the encode decode process comprising:

the encoder computing and encoding at least one portion of the input signal into a lower resolution layer corresponding to the encoded data and communicates the lower resolution layer to the decoder, the encoder, concurrently while communicating the lower resolution layer to the decoder, computing and encoding a higher resolution layer corresponding to the additional encoded data from the input signal for later communication to the decoder, such that the decoder is enabled to decode the encoded lower resolution layer of the encoded data simultaneously while the encoder is encoding the higher resolution layer from the input signal, and wherein the encode decode process provides a glass-to-glass latency for the lower resolution layer of less than or equal to 14 milliseconds of time, and wherein the 14 milliseconds include: (i) encoding time for encoding operations performed by the encoder for the lower resolution layer, (ii) decoding time for decoding operations performed by the decoder for the lower resolution layer, and (iii) transmission time for data communications between the encoder and the decoder for the lower resolution layer, wherein, in response to a determination that the higher resolution layer cannot be transmitted, the system informs the encoder that the higher resolution layer cannot be transmitted, and in response to the encoder being informed that the higher resolution layer cannot be transmitted, the encoder is caused to refresh a temporal buffer of the encoder.

2. The system of claim 1, characterized in that the encoded data is encoded in a tiled manner or a hierarchical layered manner.

3. The system of claim 2, characterized in that the encoded data is structured to conform to a LCEVC standard or a VC-6 standard.

4. The system of claim 1, characterized in that the encoded data includes metadata that is dynamically indicative of a level of quality (LoQ) of the encoded data being communicated via the data communication network, to enable the system to adjust the level of quality of the encoded data dynamically to cope with varying congestion within the data communication network.

5. The system of claim 1, characterized in that at least one lower resolution layer includes base layer data enabling a lower resolution rendition of the image frame present in the input signal to be rendered at the at least one decoder, and the at least one higher resolution layer of the encoded data includes enhancement layer data that is useable to enhance the lower resolution rendition of the image frame present in the input signal to provide an enhanced rendition of the image frame at the at least one decoder at a level of quality that is higher than that of the base layer.

6. The system of claim 5, characterized in that the system, when in operation, the encoder aborts transmission of the encoded enhancement layer data in an event of sudden congestion arising in the data communication network, and refreshes the temporal buffer so that a next frame that is communicated after a reduction in the congestion is an I-frame.

7. The system of claim 1, characterized in that the data communication network supports, when in operation, a plurality of channels of communication from the encoder, wherein mutually different categories of tiles or mutually different layers of encoded data are communicated in respective channels of the plurality of channels, such that the one or more decoders receive the encoded data from the encoder via the plurality of channels.

8. The system of claim 1, characterized in that the system is adapted for use in at least one of: video conferencing apparatus, group video game playing apparatus, remotely controlled robotics apparatus, remote surveillance apparatus, automotive vision systems and video contribution systems.

9. A method for operating a system to encode an input signal and to provide corresponding encoded data to a decoder, wherein the encoded data is communicated via a data communication network to the decoder, the decoder enabled to decode the encoded data to regenerate a rendition of the input signal, wherein the system is constrained by a timing requirement in which the system is required to start sending the encoded data, which is at a lower resolution, to the decoder as soon as the encoded data is finished being computed and in which the system is further required to send the encoded data before completing computation and/or transmission of additional encoded data corresponding to data for one or more higher resolutions, the method facilitating an encode decode process having a threshold degree of latency, the encode decode process comprising:

an encoder computing and encoding at least one portion of the input signal into a lower resolution layer corresponding to the encoded data;

communicating the lower resolution layer of the encoded data to the decoder; and concurrently while communicating the lower resolution layer to the decoder, the encoder computing and encoding at least one higher resolution layer corresponding to the additional encoded data for later communication to the decoder, such that the decoder is enabled to decode the encoded lower resolution layer simultaneously while the encoder is encoding the at least one higher resolution layer from the input signal, wherein the encode decode process provides a glass-to-glass latency for the lower resolution layer of less than or equal to 14 milliseconds of time, and wherein the 14 milliseconds include: (i) encoding time for encoding operations performed by the encoder for the lower resolution layer, (ii) decoding time for decoding operations performed by the decoder for the lower resolution layer, and (iii) transmission time for data communications between the encoder and the decoder for the lower resolution layer, wherein, in response to a determination that the higher resolution layer cannot be transmitted, the system informs the encoder that the higher resolution layer cannot be transmitted, and in response to the encoder being informed that the higher resolution layer cannot be transmitted, the encoder is caused to refresh a temporal buffer of the encoder.

10. The method of claim 9, characterized in that the encoded data is encoded in a tiled manner or a hierarchical layered manner.

11. The method of claim 10, characterized in that the encoded data is structured to conform to a LCEVC standard or a VC-6 standard.

12. The method of claim 9, characterized in that the encoded data includes metadata that is dynamically indicative of a level of quality (LoQ) of the encoded data being communicated via the data communication network, to enable the system to adjust the level of quality of the encoded data dynamically to cope with varying congestion within the data communication network.

13. The method of claim 9, characterized in that at least one lower resolution layer includes base layer data enabling a lower resolution rendition of the image frame present in the input signal to be rendered at the at least one decoder, and the at least one higher resolution layer of the encoded data includes enhancement layer data that is useable to enhance the lower resolution rendition of the image frame present in the input signal to provide an enhanced rendition of the image frame at the at least one decoder at a level of quality that is higher than that of the base layer.

14. The method of claim 9, characterized in that the method includes adapting the system for use in at least one of: video conferencing apparatus, group video game playing apparatus, remotely controlled robotics apparatus, remote surveillance apparatus, automotive vision systems and video contribution systems.

15. A computer program product comprising a non-transitory computer-readable storage medium having computer-readable instructions stored thereon, the computer-readable instructions being executable by a computerized device comprising processing hardware to cause the computerized device to perform the method of claim 9.

16. The system of claim 1, wherein a level of quality of the higher resolution layer is controlled via metadata associated with the higher resolution layer.

* * * * *